No. 861,525.  
PATENTED JULY 30, 1907.  
J. J. LANE.  
ICE CREAM REFRIGERATOR.  
APPLICATION FILED MAY 7, 1906.

2 SHEETS—SHEET 1.

Witnesses  
A. J. McCauley  
Nell L. Church

Inventor:  
John J. Lane  
by  
Bakewell & Cornwall  
Att'ys.

No. 861,525. PATENTED JULY 30, 1907.
J. J. LANE.
ICE CREAM REFRIGERATOR.
APPLICATION FILED MAY 7, 1906.

2 SHEETS—SHEET 2.

Witnesses
a.g. McCauley.
Nells L. Church

Inventor:
John J. Lane
by Bakewell + Cornwall
Att'y's.

UNITED STATES PATENT OFFICE.

JOHN J. LANE, OF ST. LOUIS, MISSOURI.

ICE-CREAM REFRIGERATOR.

No. 861,525.   Specification of Letters Patent.   Patented July 30, 1907.

Application filed May 7, 1906. Serial No. 315,580.

*To all whom it may concern:*

Be it known that I, JOHN J. LANE, a citizen of the United States, residing at St. Louis, Missouri, have invented a certain new and useful Improvement in Ice-Cream Refrigerators, of which the following is a full, clear, and exact description, such as will enable others skilled in the art to which it appertains to make and use the same, reference being had to the accompanying drawings, forming part of this specification, in which—

Figure 1:
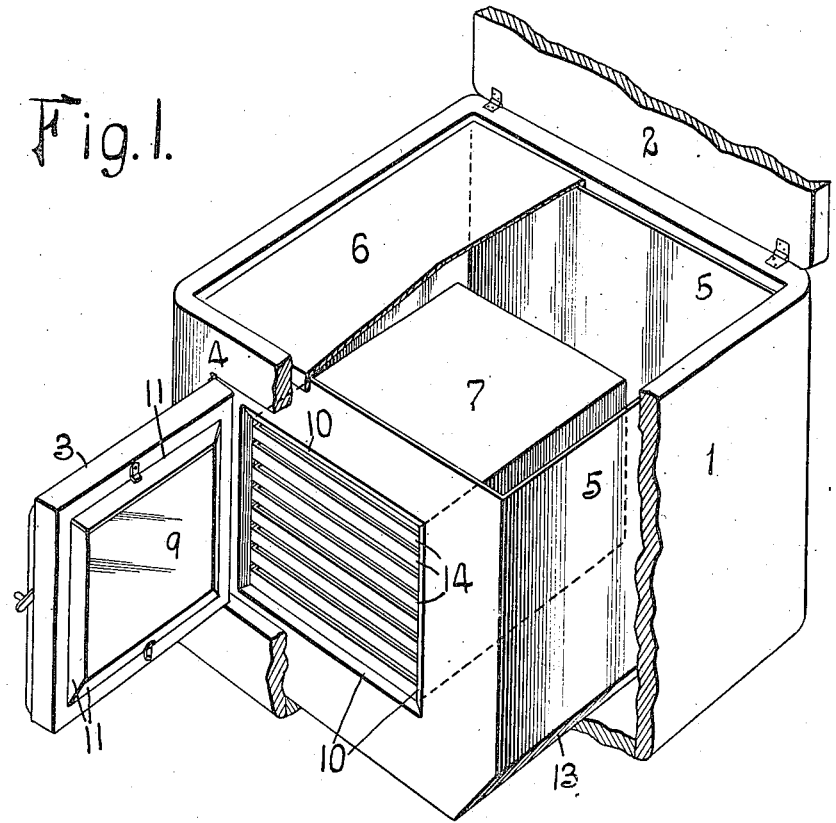
Figure 2:
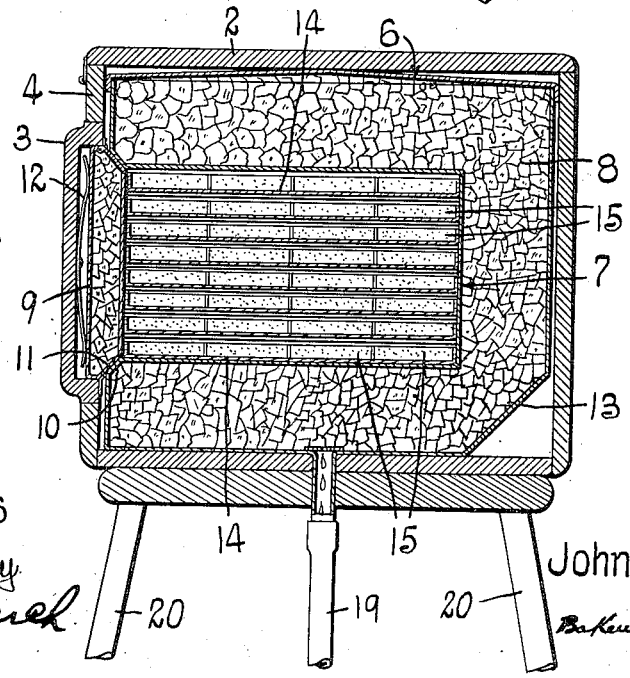
Figure 3:
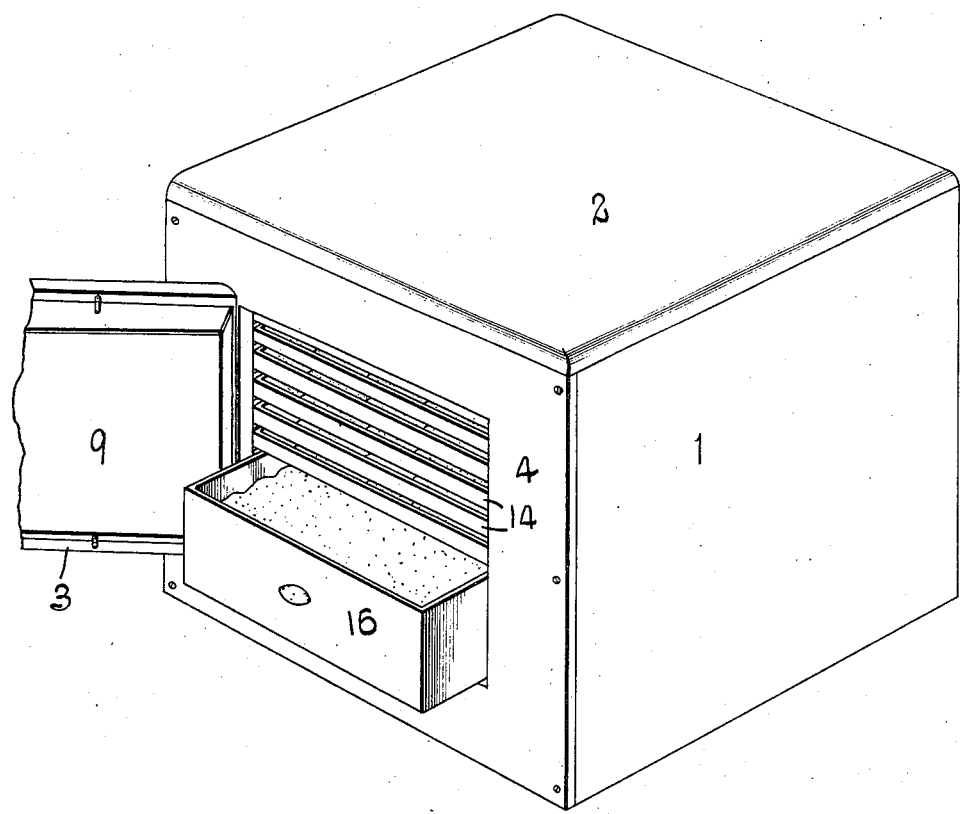

Figure 1 is a perspective view of an ice-box or refrigerator embodying the features of my invention, portions of the outer casing being broken away to show the interior construction; Fig. 2 is a vertical sectional view taken at approximately the center of the ice-box shown in Fig. 1; and Fig. 3 is a perspective view of a modified form of my invention.

This invention relates to refrigerators or ice-boxes, and particularly to that type which is used in stores for containing ice-cream which is sold in small quantities.

One object of my invention is to provide an improved refrigerator or ice-box having an inner compartment which is surrounded on all sides by some cooling means, preferably, ice.

Another object of my invention is to provide an ice-box having an inner compartment entirely surrounded by ice, said inner compartment being provided with removable trays or drawers in which the ice-cream is contained.

Other desirable features of my invention will be hereinafter pointed out.

Referring to Figs. 1 and 2 of the drawings which represent the preferred form of my invention, 1 designates a casing preferably formed of wood and provided with a hinged top 2 and a door 3 formed in its front wall 4. This casing surrounds a metal box 5 having a removable top 6, and located inside of this box 5 is a metal box 7 constituting a compartment in which the ice-cream is kept. The ice-cream compartment is spaced away from the side walls and the top and bottom of the box 5 to provide a chamber for receiving ice 8, and the door 3 of the outer casing has removably mounted thereon an ice-holding box 9 which closes the open end of the box 7 which forms the ice-cream compartment, as shown in Fig. 2.

The box 7 is connected to the front wall of the box 5 by inclined flanges 10 and the edges 11 of the box 9 are also beveled, as shown in Figs. 1 and 2, to intimately engage said flanges when the door of the casing is closed. As previously stated, the box 9 is removably connected to the door 3 so that it can be removed to fill it with ice, and for insuring that the beveled edges of said box will be held in intimate contact with the inclined flanges 10 at the open end of the box 7, I have arranged a leaf-spring 12 between the door 3 and the box 9. Preferably, the lower edge portions of the side walls of the box 5 are inclined inwardly at 13 so that the ice will be deflected underneath the ice-cream compartment when the ice-box is being filled with ice. I prefer to arrange sliding trays 14 in the ice-cream compartment, each tray containing a certain number of individual bricks 15 of ice-cream so that when a customer is being served it is necessary to pull out only one tray, and thus not expose to the air the ice-cream contained in the other trays. If desired, the ice-cream compartment can be provided with trays for containing individual bricks of ice-cream and with a drawer 16 for containing ice-cream in bulk, as shown in Fig. 3, and if desired, the front wall 4 of the wood casing may be made removable.

A drain pipe 19 extends from the interior of the ice chamber to carry away the melted ice, and the ice-box is provided with legs 20 so that the person serving the cream does not have to stoop down or assume an uncomfortable position.

While the ice-box herein shown is designed particularly for holding ice-cream it could, of course, be used for holding provisions and when used for a provision ice-box the portion above the top of the box 7 could be used as a compartment for storing meat, fish, fruit, etc. which would be placed on the ice covering the top of the box 7.

Having thus described my invention, what I claim as new and desire to secure by Letters Patent is:

1. An ice-box comprising a casing, a metal box located inside of said casing and provided with a removable top, an open-ended receptacle connected to the front wall of said box by inclined flanges and spaced away from the other walls and the top and bottom of said box to provide a chamber for receiving ice, and a door carrying an ice-holding box having beveled edges which engage said inclined flanges when the door is closed, the metal box being constructed to deflect the ice underneath the open-ended receptacle; substantially as described.

2. An ice-box comprising a casing having a metal box for holding ice located therein, an open-ended receptacle spaced away from the walls of said box and connected at its open end by means of inclined flanges to one of the walls of said box, a door carrying an ice-holding box for closing the open end of said receptacle, said ice-holding box being provided with beveled edges, and yielding means interposed between the door and ice-holding box for holding the beveled edges of the ice-holding box in intimate engagement with the inclined flanges at the open end of said receptacle; substantially as described.

In testimony whereof, I hereunto affix my signature, in the presence of two witnesses, this fourth day of May 1906.

JOHN J. LANE.

Witnesses:
WELLS L. CHURCH,
GEORGE BAKEWELL.